United States Patent
Yim et al.

(10) Patent No.: US 8,737,455 B2
(45) Date of Patent: May 27, 2014

(54) METHOD OF SELECTING ANTENNAS IN A WIRELESS COMMUNICATING NETWORK FOR HIGH RELIABILITY AND LOW LATENCY

(75) Inventors: Raymond Yim, Cambridge, MA (US); Jianlin Guo, Newton, MA (US); Philip Orlik, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 573 days.

(21) Appl. No.: 12/979,470

(22) Filed: Dec. 28, 2010

(65) Prior Publication Data

US 2012/0163486 A1 Jun. 28, 2012

(51) Int. Cl.
*H04B 1/38* (2006.01)
(52) U.S. Cl.
USPC ........... 375/220; 375/219; 455/67.1; 455/562
(58) Field of Classification Search
USPC .......................................... 375/267, 219, 315
See application file for complete search history.

(56) References Cited

U.S. PATENT DOCUMENTS

| | | | | |
|---|---|---|---|---|
| 7,526,038 | B2* | 4/2009 | McNamara | 375/267 |
| 2002/0141508 | A1* | 10/2002 | El-Gamal et al. | 375/267 |
| 2003/0083016 | A1* | 5/2003 | Evans et al. | 455/67.1 |
| 2004/0240486 | A1* | 12/2004 | Venkatesh et al. | 370/537 |
| 2006/0221920 | A1* | 10/2006 | Gopalakrishnan et al. | 370/338 |
| 2006/0268165 | A1* | 11/2006 | van Nee | 348/388.1 |

* cited by examiner

*Primary Examiner* — Sam K Ahn
*Assistant Examiner* — Janice Tieu
(74) *Attorney, Agent, or Firm* — Dirk Brinkman; Gene Vinokur

(57) ABSTRACT

A network includes a transmitter and a receiver, wherein the transmitter includes a set of transmit antennas and the receiver includes a set of receive antennas. The transmitter duplicates a packet as copies of the packet, and selects subsets of the set of transmit antennas independent of channel characteristics between the subsets of transmit antennas and the set of receive antennas, wherein combinations of the antennas in the subsets of the transmit antennas are different. The receiver selects subsets of the set of receive antennas independent of channel characteristics between the subsets of receive antennas and the set of transmit antennas, wherein combinations of the antennas in the subsets of the receive antennas are different. The selected subsets are used to transmit the packet, and retransmit the packet in case of a failure in a previous transmission.

7 Claims, 3 Drawing Sheets

METHOD OF SELECTING ANTENNAS IN A WIRELESS COMMUNICATING NETWORK FOR HIGH RELIABILITY AND LOW LATENCY

FIELD OF THE INVENTION

This invention relates to wireless communications, and more particular to selecting antennas in wireless communication network.

BACKGROUND OF THE INVENTION

The reliability of wireless (radio) communications depends heavily on characteristics of underlying wireless channels. When the channel characteristics are good, reliable communications can be achieved, but when the channel characteristic are bad, or more specifically when fade occurs in the channels, and the signal to noise ratio (SNR) is low, communications fails. Depending on a location and mobility of the transmitter and the receiver, and the environment of the channel, the channel characteristic can vary slowly or quickly.

To improve reliability, a number of diversity techniques are known. When sufficient frequency bandwidth is allocated to a network, a frequency diversity technique can be used by repeating a transmission in different frequency bands that have relatively low correlation with respect to each other. However, frequency diversity is impossible in certain channel environment with high coherent bandwidth compared to an allowable transmission bandwidth.

If the channel environment varies quickly, time diversity technique can be used by repeating a transmission at different times because the channel realizations have relatively low correlation with each other. However, time diversity is impossible in certain slowly varying channels compared to the latency constraint of transmission. That is, if the wireless channels at disjoint time intervals are strongly correlated, a failed transmission at a time interval implies failed transmission also at another interval nearby. In other words, time diversity cannot be achieved.

When the transmitter and the receiver have multiple transmit or receive antennas, space diversity can be achieved by transmitting data via different antennas, and combining the data appropriately at the receiver. Reliability can be improved as long as the transmit antennas and the receive antennas are spatially separated.

To reduce the cost of multiple antenna networks, an antenna selection diversity technique can be used at the transmitter and the receiver. Specifically, conventional antenna selection estimates channels characteristics between various transmit and receive antennas, and uses a subset of the available antennas that have optimal channel characteristics. Antenna selection diversity based on channel characteristics requires feedback to select the subset of optimal antennas, which increases overhead, latency, and power consumption.

Other ways of improving reliability of transmission can be achieved in a medium access control layer (MAC), such as automated repeat request (ARQ) and hybrid ARQ (HARQ). Those techniques require feedback from the receiver to transmitter to indicate whether a transmission is received successfully, and a retransmission is performed when a previous transmission fails. However, the use of feedback increases latency of the transmission.

It is desirable to implement a wireless network at a low cost and power consumption, with limited bandwidth, while still achieving high reliability and low latency.

SUMMARY OF THE INVENTION

Embodiments of the invention provide a method to combine time diversity re-transmission and antenna diversity by switching antennas to achieve high reliable, low latency, and low cost wireless communications.

DETAILED DESCRIPTION OF THE PREFERRED EMBODIMENT

The embodiments of the invention operate in a wireless network where transceivers include multiple antennas that are spatially uncorrelated in terms of wireless communication channels. After a packet has been transmitted, a repeated transmission is performed using different subsets of antenna.

Network without Feedback

In time critical network, data must be delivered reliably to a receiver in a very short amount of time. To ensure reliability and low latency, the packet is repeatedly transmitted multiple times without feedback. This is similar to what is done in time diversity technique. However, different from time diversity, during each transmission, a different antenna, or antenna combination, is used automatically to transmit the packet. This ensures that repeated transmissions are transmitted over independent wireless channels.

Figure 1:
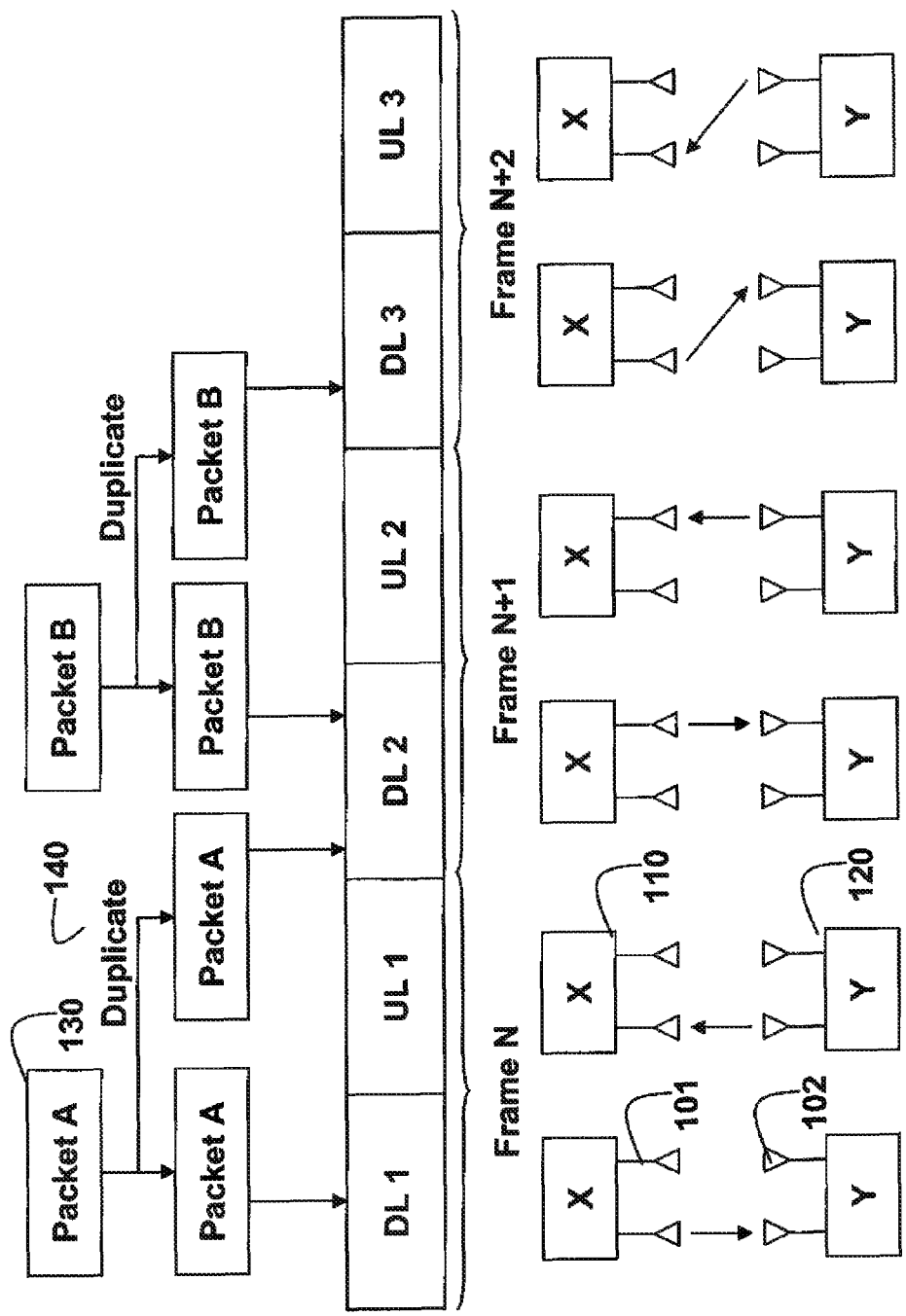
FIG. 1 is a schematic of a wireless network that combines antenna diversity and time diversity according to embodiments of the invention.
Figure 2:
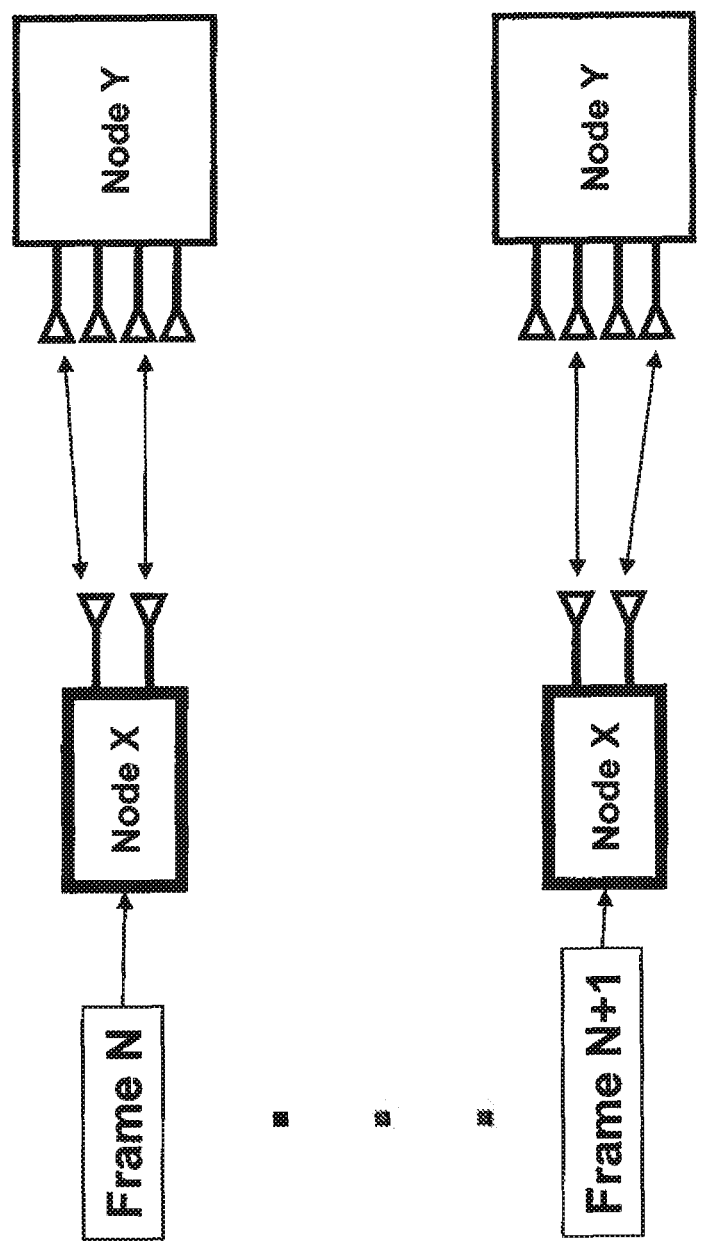
FIG. 2 is a schematic of a data communication network with combination of antenna diversity, spatial diversity and time diversity according to embodiments of the invention.

FIGS. 1 and 2 show an example of switched antenna diversity in a network with two transmit (Tx) antennas 101 at each transmitter 110, and two receive (Rx) antennas 102 at each receiver 120.

In the example, each packet 130 is duplicated 140 and transmitted over two temporally disjoint frames. For example, Packet A is transmitted in a downlink (DL) channel from node X to node Y in downlink channels DL 1 and DL 2, and Packet B is transmitted in downlink channels DL 2 and DL 3. With 2 transmit and 2 receive antennas, a total of four antenna combinations can be formed: Tx 1-Rx 1, Tx 2-Rx 2, Tx 1-Rx 2, and Tx 2-Rx 1. Subsequent transmission uses different antenna combinations. Transmissions on the uplink (UL) channels are performed similarly.

In this example, both the transmitter and receiver have two antennas. One transceiver chain is used for each transmission because only one active antenna is selected at a given time using a switching circuit.

Even though the example shows that packets are duplicated and transmitted over two disjoint frames, in a single antenna transmission with two Tx and two Rx antennas, a total of four repetitions can be achieved with independent channels by considering all 2×2 two antenna combinations, if the latency constraints can be satisfied.

Switched antenna diversity can be used with other forms of diversity, such as frequency and spatial diversity. It is noted that the antenna selection of the embodiments of the invention is performed independent of the channel characteristics.

Hence, the embodiments do not estimate the channel characteristics and do not feed back the channels characteristic, either from the transmitter to the receiver, or from the receiver to the transmitter. This greatly reduces overhead, latency and power consumption When switched antenna diversity is used with frequency diversity, a transmission is further duplicated and transmitted over multiple frequency bands at the same time, and different antenna combinations are used to transmit packets at different times.

When switched antenna diversity is used with spatial diversity, multiple antennas are used at the same time to transmit and receive signal at a given time, and a different combinations of multiple antennas are used at different times. For example, if node X has two antennas and node Y has four antennas, a 2×2 MIMO network implemented with switched antenna diversity. In Frame N, node X uses both of antennas and node Y uses two out of the four antennas. In Frame N+1, node X still uses both antennas and node Y uses another two out of the four antennas.

In general, when there is a set of N antennas in one node, and a set of M antennas in another node, a P×Q MIMO network with switched antenna diversity can be implemented with NM/PQ antenna combinations.

Network with Feedback

In some network, feedback in physical (PHY) layer or medium access control (MAC) layer can indicate a failed transmission, and Automated Repeat reQuest (ARQ) is used to automatically retransmit a packet when the failure occurs. Typically, ARQ does not consider the specific antenna pattern used in a previous transmission. With switched antenna diversity, a different antenna, or another combination, is used when a retransmission is needed.

Figure 3:
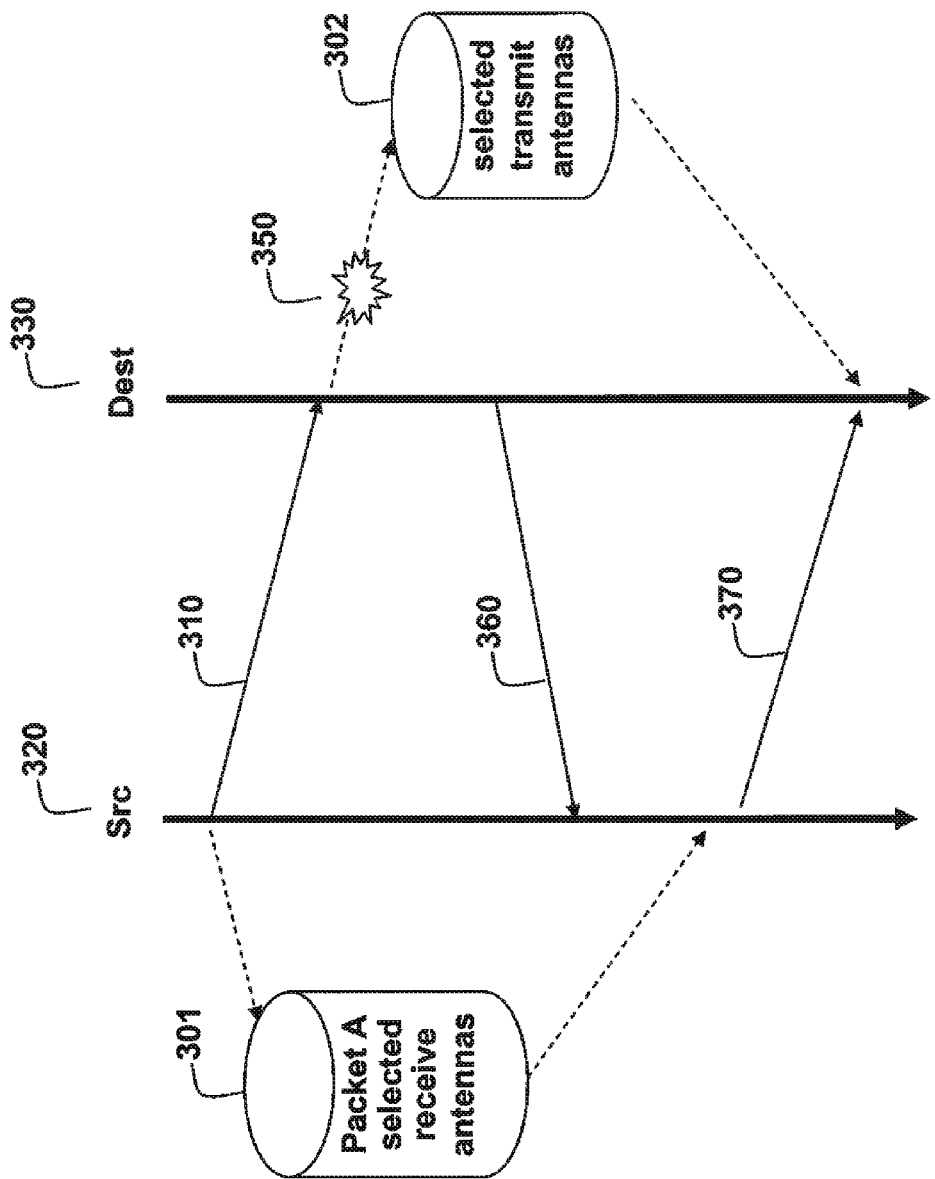
FIG. 3 is another schematic of a data communication network with combination of antenna diversity, spatial diversity and time diversity according to embodiments of the invention.

As shown in FIG. 3, a packet A 301 is transmitted 310 from a source (Src) 320 to a destination (Dest) 330. When the source first sends packet A, the source stores a copy of packet A in a buffer 301 along with information about the selected subsets of transmit antennas.

When the destination receives packet A, the destination stores the selected receive antenna information in a buffer 302. If packet A fails to decode 350, the destination sends a feedback packet 360 to the source indicating that packet A needs to be retransmitted.

When the source receives the feedback, in the MAC layer, the source retrieves packet A and the transmit antenna information from the buffer 301, and informs the PHY layer to retransmit 370 packet A using another subset of transmit antennas.

Depending on the number of antenna combinations available at the transmitter and receiver, antenna pattern of either the transmitter or the receiver do not change. In the example shown in FIG. 3, only the transmitter changes antenna during the retransmission, while the receiver uses the same antenna for both the initial transmission 310 and the retransmission 370. Alternative, the receiver switches between antenna subsets and the transmitter does not. In another embodiment, both the transmitter and the receiver switch subsets for the copies of the packet.

In general, the number of antennas available in each node is known, either statically, set during network design, or using protocol during an initial association process. A permutation pattern can be used to select antennas for multiple transmissions. For example, with two Tx and two Rx transmitters, the antenna switches so that the switching rotates through: Tx-1, Rx-1; then Tx-2, Rx-1; then Tx-2, Rx-2; then Tx-1, Rx-2.

If the number of antennas is not known, it is possible to randomize the switching mechanism, so that each retransmission has a high probability of using different antenna combinations.

If the receiver has multiple transceiver chains, it is possible to use antenna combining technique in addition to antenna switching.

Effect of the Invention

In conventional antenna selection techniques, the antenna selection is strongly based on the suitability of the selected antennas. Therefore, prior art techniques estimate the channel characteristics, e.g., channels that are low noise, high signal strength, slowly varying, and the like for all possible antenna combinations, and then select the optimal subset of antennas. As described above this introduces considerable delay and overhead due to the feedback required for the channel estimation process. In addition, channel estimation consumes power.

In contrast, the antenna selection according to the embodiments of the invention performs antenna selection independent of the channel characteristics. Although, the signaling performance for some of the selected antennas may be suboptimal, spatial diversity is still improved without introducing any additional delay and overhead inherent in the prior art channel estimation processes. This is important for battery operated transceivers that demand a low overhead, and for time critical applications that are delay sensitive, such as networks that operate in conjunction with safety systems.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting antennas to communicate a packet in a network, wherein the network includes a transmitter and a receiver, wherein the transmitter includes a set of transmit antennas and the receiver includes a set of receive antennas, comprising the steps of:

duplicating, in the transmitter, the packet as copies of the packet;

selecting, in the transmitter, subsets of the set of transmit antennas independent of channel characteristics between the subsets of transmit antennas and the set of receive antennas, wherein combinations of the antennas in the subsets of the transmit antennas are different;

selecting, in the receiver, subsets of the set of receive antennas independent of channel characteristics between the subsets of receive antennas and the set of transmit antennas, wherein combinations of the antennas in the subsets of the receive antennas are different;

transmitting, by the transmitter, each copy of the packet without receiving a feedback from the receiver; and transmitting, by the transmitter, each copy of the packet from the transmitter to the receiver using a different frame and a different subset of the antennas for each frame and each copy of the packet, while the receiver uses a single subset of the receive antennas to receive the copies of the packet, wherein the frames are temporally disjoint in time to reduce overhead and delay in the network.

2. The method of claim 1, further comprising:
transmitting, by the transmitter, each copy of the packet from the transmitter to the receiver using a different frame and a single subset of the antennas for each frame and each copy of the packet, while the receiver uses a different subset of the antennas for receiving each frame and each copy of the packet, wherein the frames are temporally disjoint in time to reduce overhead and delay in the network.

3. The method of claim 1, further comprising:
transmitting, by the transmitter, each copy of the packet from the transmitter to the receiver using a different frame and a different subset of the antennas for each frame and each copy of the packet, while the receiver uses a different subset of the antennas for receiving each frame and each copy of the packet, wherein the frames are temporally disjoint in time to reduce overhead and delay in the network.

4. The method of claim 1, wherein the transmit antennas and the receive antennas are spatially uncorrelated in terms of wireless communication channels.

5. The method of claim 1, wherein the transmitting uses frequency and spatial diversity.

6. A method for communicating a packet in a network, wherein the network includes a transmitter and a receiver, wherein the transmitter includes a set of transmit antennas, comprising the steps of:
selecting a subset of the set of transmit antennas independent of channel characteristics between the set of transmit antennas and the set of receive antennas;
transmitting, without receiving a feedback from the receiver, multiple copies of the packet using the subset of transmit antennas; and
transmitting, by the transmitter, each copy of the packet from the transmitter to the receiver using a different frame and a single subset of the antennas for each frame and each copy of the packet, while the receiver uses a different subset of the antennas for receiving each frame and each copy of the packet, wherein the frames are temporally disjoint in time to reduce overhead and delay in the network.

7. A method for selecting antennas to communicate a packet in a network, wherein the network includes a transmitter and a receiver, wherein the transmitter includes a set of transmit antennas and the receiver includes a set of receive antennas, comprising the steps of:
duplicating, in the transmitter, the packet as copies of the packet;
selecting, in the transmitter, subsets of the set of transmit antennas independent of channel characteristics between the subsets of transmit antennas and the set of receive antennas, wherein combinations of the antennas in the subsets of the transmit antennas are different;
selecting, in the receiver, subsets of the set of receive antennas independent of channel characteristics between the subsets of receive antennas and the set of transmit antennas, wherein combinations of the antennas in the subsets of the receive antennas are different;
transmitting, by the transmitter, each copy of the packet without receiving a feedback from the receiver; and
transmitting, by the transmitter, each copy of the packet from the transmitter to the receiver using a different frame and a different subset of the antennas for each frame and each copy of the packet, while the receiver uses a different subset of the antennas for receiving each frame and each copy of the packet, wherein the frames are temporally disjoint: in time to reduce overhead and delay in the network.

* * * * *